US012122176B2

(12) United States Patent
Ikeda et al.

(10) Patent No.: US 12,122,176 B2
(45) Date of Patent: Oct. 22, 2024

(54) THERMAL TRANSFER SHEET

(71) Applicant: Dai Nippon Printing Co., Ltd., Tokyo (JP)

(72) Inventors: Megumi Ikeda, Tokyo (JP); Tadahiro Ishida, Tokyo (JP); Yuzu Imakura, Tokyo (JP); Yusuke Narumi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 97 days.

(21) Appl. No.: 17/309,974

(22) PCT Filed: Jan. 9, 2020

(86) PCT No.: PCT/JP2020/000536
§ 371 (c)(1),
(2) Date: Jul. 7, 2021

(87) PCT Pub. No.: WO2020/153140
PCT Pub. Date: Jul. 30, 2020

(65) Prior Publication Data

US 2022/0153051 A1 May 19, 2022

(30) Foreign Application Priority Data

Jan. 24, 2019 (JP) ................................ 2019-010619

(51) Int. Cl.
*B41M 5/44* (2006.01)
*B41M 5/382* (2006.01)
*B41M 5/42* (2006.01)

(52) U.S. Cl.
CPC .......... *B41M 5/44* (2013.01); *B41M 5/38214* (2013.01); *B41M 5/423* (2013.01);
(Continued)

(58) Field of Classification Search
CPC .... B41M 5/44; B41M 5/423; B41M 5/38214; B41M 5/443; B41M 5/42; B41M 2205/06;
(Continued)

(56) References Cited

U.S. PATENT DOCUMENTS 4,970,119 A * 11/1990 Koshizuka ......... B41M 5/38207 428/913
5,219,610 A 6/1993 Koshizuka et al.
(Continued)

FOREIGN PATENT DOCUMENTS

CN 105985744 A 10/2016
JP S61-235189 A1 10/1986
(Continued)

OTHER PUBLICATIONS

Plastic Optical Fiber Cable And Plastic Optical Fiber Cable With Plug, JP 2005031138 A1 (Year: 2005).*
(Continued)

*Primary Examiner* — Betelhem Shewareged
(74) *Attorney, Agent, or Firm* — BURR PATENT LAW, PLLC

(57) ABSTRACT

Provided is a thermal transfer sheet that can form a good image on both a transfer object made of a polyethylene terephthalate and a transfer object made of a polypropylene, as well as can form an image with high alcohol resistance. The thermal transfer sheet of the present invention includes a substrate, and a transfer layer including a colored layer and an adhesive layer, in which the adhesive layer has a phase-separated structure formed by a polyester and a polyolefin that are incompatible with each other, and in which the percentage of the region formed by one of the polyester and the polyolefin to the total area (100%) of the adhesive layer is 55% or more and 85% or less.

10 Claims, 4 Drawing Sheets

(52) U.S. Cl.
CPC ............... *B41M 5/443* (2013.01); *B41M 5/42* (2013.01); *B41M 2205/06* (2013.01); *B41M 2205/30* (2013.01); *B41M 2205/38* (2013.01); *B41M 2205/40* (2013.01)

(58) Field of Classification Search
CPC .......... B41M 2205/30; B41M 2205/38; B41M 2205/40
USPC ........................................................ 428/32.82
See application file for complete search history.

(56) References Cited

U.S. PATENT DOCUMENTS

| | | | | |
|---|---|---|---|---|
| 5,387,491 | A | 2/1995 | Takada et al. | |
| 6,210,794 | B1 * | 4/2001 | Nakamura | B41M 5/345 428/32.79 |
| 2001/0036997 | A1 * | 11/2001 | Usui | C09D 11/10 525/193 |
| 2022/0153051 | A1 * | 5/2022 | Ikeda | B41M 5/423 |

FOREIGN PATENT DOCUMENTS

| | | | |
|---|---|---|---|
| JP | H07-064287 | A1 | 3/1995 |
| JP | H09-272269 | A1 | 10/1997 |
| JP | 2001-130150 | A1 | 5/2001 |
| JP | 2008-088332 | A | 4/2008 |
| JP | 2011-201212 | A1 | 10/2011 |
| JP | 2019-006100 | A1 | 1/2019 |

OTHER PUBLICATIONS

Chinese Office Action (Application No. 202080006587.0) dated Nov. 21, 2022 (with English translation) (16 pages).

English translation of the International Preliminary Report on Patentability (Chapter I) dated Aug. 5, 2021 (Application No. PCT/JP2020/000536).

Chinese Office Action (Application No. 202080006587.0) dated Apr. 1, 2022 (with English translation).

International Search Report and Written Opinion (Application No. PCT/JP2019/000536) dated Mar. 3, 2020.

Japanese Office Action (Application No. 2019-010619) dated Jun. 26, 2020 (with English translation).

Korean Office Action (with English translation) dated Apr. 25, 2024 (Application No. 10-2021-7013192).

* cited by examiner

THERMAL TRANSFER SHEET

BACKGROUND OF THE INVENTION

Field of the Invention

The present invention relates to a thermal transfer sheet.

Background Art

Conventionally, a thermofusible transfer process is known. In the process, a thermal transfer sheet including a substrate, and a transfer layer including a colored layer and an adhesive layer receives energy via a thermal head or the like, thereby transferring the transfer layer to a transfer object, such as paper or a plastic sheet, and forming an image, to produce a printed matter.

Because the image formed by the thermofusible transfer process is of high density and excellent in the sharpness, the process is suitable for recording binary images such as characters and line drawings. In addition, the thermofusible transfer process enables variable information, such as addresses, customer information, numberings, and barcodes, to be recorded on a transfer object using a computer and a thermal transfer printer.

Polyethylene terephthalate (PET) and polypropylene (PP) are often used as materials for constituting the transfer objects. PET and PP have very different solubility parameters (SP values), which has made it difficult to form a high quality image on both PET and PP transfer objects with a single thermal transfer sheet.

PRIOR ART DOCUMENT

Patent Document

Patent Literature 1: JP 1986-235189 A

SUMMARY OF THE INVENTION

Problems to be Solved by the Invention

The present inventors have found that a good image can be formed on both a transfer object made of PET (hereinafter, referred to as "PET transfer object") and a transfer object made of PP (hereinafter, referred to as "PP transfer object") (hereinafter, may be referred to as "image formation properties"), by making an adhesive layer included in a transfer layer of a thermal transfer sheet contain a polyester and a polyolefin that are incompatible with each other, and adjusting the percentages of the areas of two regions formed by them. The present inventors have also found that an image formed with such a thermal transfer sheet has high alcohol resistance.

Accordingly, an object of the present invention is to provide a thermal transfer sheet that can form a good image on both PET and PP transfer objects, as well as can form an image with high alcohol resistance.

Means for Solving the Problems

The thermal transfer sheet of the present invention includes:

a substrate; and a transfer layer including a colored layer and an adhesive layer, the adhesive layer having a phase-separated structure formed by a polyester and a polyolefin that are incompatible with each other, and the percentage of the region formed by one of the polyester and the polyolefin to the total area (100%) of the adhesive layer being 55% or more and 85% or less.

In one embodiment, the percentage of the region formed by the polyester to the total area (100%) of the adhesive layer is 55% or more and 85% or less.

In one embodiment, the polyolefin contained in the adhesive layer is a chlorinated polyolefin.

In one embodiment, the chlorinated polyolefin contained in the adhesive layer is an acid-modified chlorinated polyolefin.

In one embodiment, the content of the polyolefin in the adhesive layer is 13% by mass or more and 40% by mass or less.

In one embodiment, the chlorinated polyolefin contained in the adhesive layer has a chlorination rate of 10% or more and 55% or less.

In one embodiment, the adhesive layer is formed with an adhesive layer-forming coating liquid containing toluene and methyl ethyl ketone.

In one embodiment, the polyolefin contained in the adhesive layer has a number average molecular weight of less than 50,000.

In one embodiment, the adhesive layer has a thickness of 0.05 μm or more and 0.5 μm or less.

In one embodiment, the transfer layer includes a peeling layer under the colored layer, the peeling layer containing a polyethylene glycol having a number average molecular weight of 8,000 or more and 23,000 or less.

In one embodiment, the peeling layer further contains a wax.

Effect of the Invention

According to the present invention, a thermal transfer sheet is provided that can form a good image on both PET and PP transfer objects, as well as can form an image with high alcohol resistance.

DETAILED DESCRIPTION OF THE INVENTION (Thermal Transfer Sheet)

Figure 1:
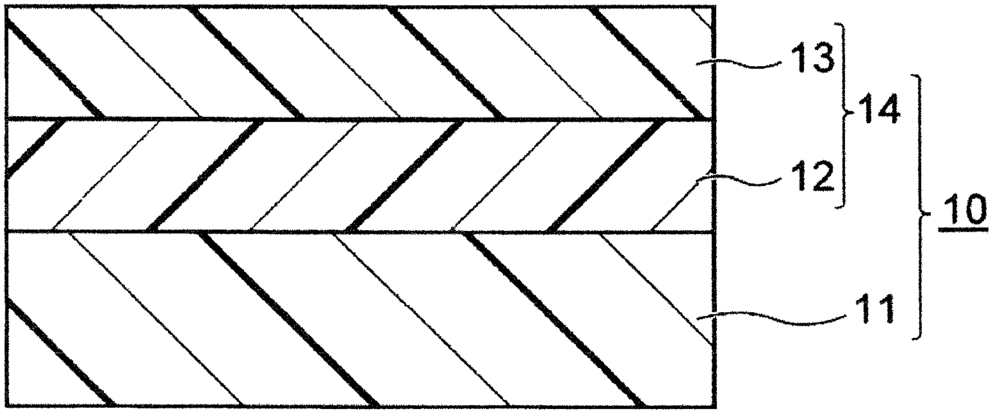
FIG. 1 is a schematic sectional view showing one embodiment of the thermal transfer sheet of the present invention.

As shown in FIG. 1, the thermal transfer sheet 10 of the present invention includes: a substrate 11; and a transfer layer 14 including a colored layer 12 and an adhesive layer 13.

Figure 2:
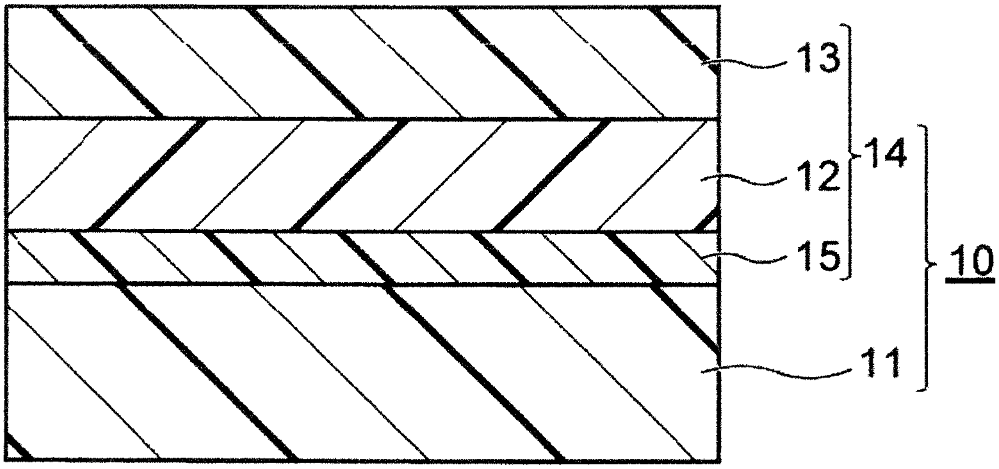
FIG. 2 is a schematic sectional view showing one embodiment of the thermal transfer sheet of the present invention.

As shown in FIG. 2, the transfer layer 14 further includes a peeling layer 15 under the colored layer 12.

Figure 3:
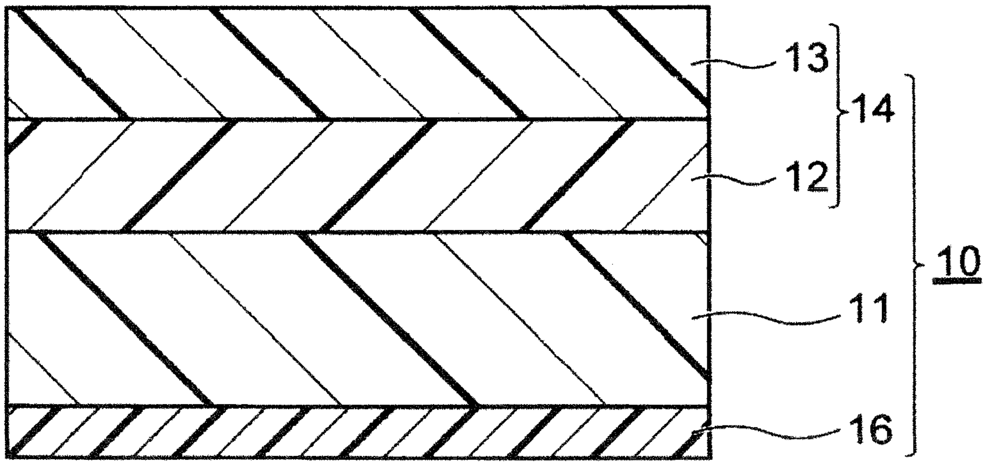
FIG. 3 is a schematic sectional view showing one embodiment of the thermal transfer sheet of the present invention.

In one embodiment, as shown in FIG. 3, the thermal transfer sheet 10 also includes a back layer 16 on the surface of the substrate 11 opposite to the surface provided with the transfer layer 14.

In one embodiment, the thermal transfer sheet 10 of the present invention may further include a release layer and/or a primer layer on the substrate (not shown in figure).

Hereinafter, the layers provided in the thermal transfer sheet of the present invention will be described.

(Substrate)

Any substrate can be used that has such heat resistance that it can withstand the thermal energy applied during thermal transfer, and such mechanical strength that it can support the transfer layer and the like provided on the substrate, as well as solvent resistance.

Examples of the substrate that can be used include films made of the following (hereinafter, simply referred to as "resin films"): polyesters such as polyethylene terephthalate (PET), polybutyrene terephthalate (PBT), polyethylene naphthalate (PEN), 1,4-polycyclohexylenedimethylene terephthalate, copolymer of terephthalic acid, cyclohexanedimethanol, and ethylene glycol; polyamides such as nylon 6 and nylon 6,6; polyolefins such as polyethylene (PE), polypropylene (PP), and polymethylpentene; vinyl resins such as polyvinyl chloride, polyvinyl alcohol (PVA), polyvinyl acetate, vinyl chloride-vinyl acetate copolymer, polyvinyl butyral, and polyvinylpyrrolidone (PVP); (meth)acrylic resins such as polyacrylate, polymethacrylate, and polymethyl methacrylate; imide resins such as polyimide and polyetherimide; cellulose resins such as cellophane, cellulose acetate, nitrocellulose, cellulose acetate propionate (CAP), and cellulose acetate butyrate (CAB); styrene resins such as polystyrene (PS); polycarbonate; and ionomer resins.

Among the above-mentioned resins, polyesters such as PET and PEN are preferable, and PET is particularly preferable, from the viewpoint of heat resistance and mechanical strength.

As used herein, the term "(meth)acryl" includes both "acryl" and "methacryl." As used herein, the term "(meth) acrylate" includes both "acrylate" and "methacrylate."

The substrate may be a laminate of the resin films described above. The laminate of the resin films may be produced using a dry lamination method, a wet lamination method, or an extrusion method.

When the substrate is a resin film, the resin film may be a stretched film or an unstretched film, preferably a uniaxially- or biaxially-stretched film from the viewpoint of the strength.

The thickness of the substrate is preferably 2 μm or more and 25 μm or less, more preferably 3 μm or more and 10 μm or less. This results in excellent mechanical strength of the substrate and excellent heat energy transfer during heat transfer.

(Transfer Layer)

The thermal transfer sheet of the present invention includes a transfer layer, the transfer layer including at least a colored layer and an adhesive layer.

In one embodiment, the transfer layer further includes a peeling layer under the colored layer.

(Colored Layer)

The colored layer included in the thermal transfer sheet of the present invention contains at least a colorant and a resin material.

The colorant contained in the colored layer can be selected and used, as appropriate, from a carbon black, an inorganic pigment, an organic pigment, or a dye depending on, for example, the required color. For example, in the case of bar code printing, the colorant preferably has especially sufficient black density and does not discolor or fade due to, for example, light and heat. Examples of such a colorant include carbon blacks such as lamp black, graphite and nigrosine dyes. When color printing is required, another chromatic color dye or pigment is employed.

The content of the colorant in the colored layer is preferably 25% by mass or more and 45% by mass or less, more preferably 30% by mass or more and 45% by mass or less. This further improves the image formation properties of the thermal transfer sheet of the present invention on both PET and PP transfer objects. This also improves the alcohol resistance and the concentration of the printed matter produced using the thermal transfer sheet.

Preferably, the colored layer contains at least one of a polyester and a vinyl chloride-vinyl acetate copolymer as resin material(s). This further improves the image formation properties of the thermal transfer sheet of the present invention on both PET and PP transfer objects.

In one embodiment, the colored layer contains a first polyester having a number average molecular weight (Mn) of 15,000 or more and a second polyester having a Mn of 5,000 or less. This further improves a PET transfer object and a PP transfer object of the thermal transfer sheet of the present invention, as well as the alcohol resistance of the printed matter produced using the thermal transfer sheet.

In the present invention, the Mn is a value obtained by gel permeation chromatography (GPC) according to JIS K 7252-1 (2008) in terms of polystyrene.

The Mn of the first polyester is preferably 15,000 or more and 40,000 or less, more preferably 15,000 or more and 25,000 or less from the viewpoint of the alcohol resistance.

The Mn of the second polyester is preferably 2,000 or more and 5,000 or less, more preferably 3,000 or more and 5,000 or less from the viewpoint of the alcohol resistance.

The colored layer may contain two or more kinds of the first polyesters and may contain two or more kinds of the second polyesters.

As used herein, the term "polyester" means a copolymer of a dicarboxylic acid compound and a diol compound.

Examples of the dicarboxylic acid compound include malonic acid, succinic acid, glutaric acid, adipic acid, suberic acid, sebacic acid, dodecanedioic acid, eicosanedioic acid, pimelic acid, azelaic acid, methylmalonic acid, ethylmalonic acid, adamantanedicarboxylic acid, norbornenedicarboxylic acid, cyclohexanedicarboxylic acid, decalindicarboxylic acid, terephthalic acid, isophthalic acid, phthalic acid, 1,4-naphthalenedicarboxylic acid, 1,5-naphthalenedicarboxylic acid, 2,6-naphthalenedicarboxylic acid, 1,8-naphthalenedicarboxylic acid, 4,4'-diphenyldicarboxylic acid, 4,4'-diphenyletherdicarboxylic acid, 5-sodiumsulfoisophthalic acid, phenylindandicarboxylic acid, anthracenedicarboxylic acid, phenanthrenedicarboxylic acid, and 9,9'-bis(4-carboxyphenyl)fluorene, as well as ester derivatives thereof.

Examples of the diol compound include ethylene glycol, 1,2-propanediol, 1,3-propanediol, butanediol, 2-methyl-1,3-propanediol, hexanediol, neopentyiglycol, cyclohexanedimethanol, cyclohexanediethanol, decahydronaphthalenedimethanol, decahydronaphthalenediethanol, norbornanedimethanol, norbornanediethanol, tricyclodecanedimethanol, tricyclodecaneethanol, tetracyclododecanedimethanol, tetracyclododecanediethanol, decalindimethanol, decalindiethanol, 5-methylol-5-ethyl-2-(1,1-dimethyl-2-hydroxyethyl)-1,3-dioxane, cyclohexanediol, bicyclohexyl-4,4'-diol, 2,2-bis (4-hydroxycyclohexyl)propane, 2,2-bis(4-(2-hydroxyethoxy)cyclohexyl)propane, cyclopentanediol, 3-methyl-1,2-cyclopentadiol, 4-cyclopentene-1,3-diol, adamantanediol, para-xylylene glycol, bisphenol A, bisphenol S, styrene glycol, trimethylolpropane, and pentaerythritol.

Without impairing the characteristics of the present invention, the copolymer may include a compound other than the dicarboxylic acid compound and the diol compound as a copolymer component. The percentage of the constituent unit derived from the other compound in the polyester is preferably 10% by mass or less, more preferably 5% by mass or less, still more preferably 3% by mass or less.

The content of the first polyester in the colored layer is preferably 20% by mass or more and 40% by mass or less, more preferably 25% by mass or more and 34% by mass or less. This further improves the image formation properties of the thermal transfer sheet of the present invention on both PET and PP transfer objects, as well as the alcohol resistance of the printed matter produced using the thermal transfer sheet.

The content of the second polyester in the colored layer is preferably 20% by mass or more and 45% by mass or less, more preferably 25% by mass or more and 39% by mass or less. This further improves the image formation properties of the thermal transfer sheet of the present invention on both PET and PP transfer objects, as well as the alcohol resistance of the printed matter produced using the thermal transfer sheet.

The ratio of the content of the first polyester to the content of the second polyester in the colored layer (the content of the first polyester/the content of the second polyester) is preferably 45/55 or more and 80/20 or less, more preferably 45/55 or more and 55/45 or less in terms of mass. This further improves the image formation properties of the thermal transfer sheet of the present invention on both PET and PP transfer objects, as well as the alcohol resistance of the printed matter produced using the thermal transfer sheet.

In one embodiment, the colored layer contains a vinyl chloride-vinyl acetate copolymer having a Mn of 20,000 or less. This further improves the image formation properties of the thermal transfer sheet of the present invention on both PET and PP transfer objects, as well as the alcohol resistance of the printed matter produced using the thermal transfer sheet.

The Mn of the vinyl chloride-vinyl acetate copolymer is preferably 8,000 or more and 18,000 or less, more preferably 10,000 or more and 15,000 or less from the viewpoint of the alcohol resistance.

As used herein, the term "vinyl chloride-vinyl acetate copolymer" means a copolymer of vinyl chloride and vinyl acetate.

Without impairing the characteristics of the present invention, the vinyl chloride-vinyl acetate copolymer may also contain a compound other than vinyl chloride and vinyl acetate as a copolymer component. The percentage of the constituent unit derived from the other compound in the vinyl chloride-vinyl acetate copolymer is preferably 10% by mass or less, more preferably 5% by mass or less, still more preferably 3% by mass or less.

The content of the vinyl chloride-vinyl acetate copolymer in the colored layer is preferably 40% by mass or more and 85% by mass or less, more preferably 50% by mass or more and 80% by mass or less, still more preferably 55% by mass or more and 75% by mass or less. This further improves the image formation properties of the thermal transfer sheet of the present invention on both PET and PP objects, as well as the alcohol resistance of the printed matter produced using the thermal transfer sheet.

The colored layer may contain a resin material other than the polyester and the vinyl chloride-vinyl acetate copolymer without impairing the effects of the present invention.

Examples of the resin material include polyamides, polyolefins, vinyl resins, (meth)acrylic resins, cellulose resins, styrene resins, polycarbonate, and ionomer resins.

The content of the resin material in the colored layer is preferably 55% by mass or more and 75% by mass or less, more preferably 55% by mass or more and 70% by mass or less, still more preferably 55% by mass or more and 65% by mass or less. This further improves the alcohol resistance of the printed matter produced using the thermal transfer sheet of the present invention, as well as the image density.

Without impairing the characteristics of the present invention, the colored layer may contain an additive such as a filler, a plasticizer, an antistatic, an ultraviolet absorber, an inorganic fine particle, an organic fine particle, a release agent, or a dispersant.

The thickness of the colored layer is preferably 0.3 μm or more and 1.2 μm or less, more preferably 0.4 μm or more and 1 μm or less. This results in maintenance of the image formation properties of the thermal transfer sheet of the present invention on both PET and PP transfer objects, and the alcohol resistance of the printed matter produced using the thermal transfer sheet, as well as improvement in the transfer properties of the transfer layer and the density of the formed image.

The colored layer can be formed by dispersing or dissolving the above-described materials in water or a suitable solvent, applying the dispersion or solution on the peeling layer by a known means, such as by roll coating, reverse roll coating, gravure coating, reverse gravure coating, bar coating, or rod coating, to form a film, and drying the film.

(Adhesive Layer)

The thermal transfer sheet of the present invention includes an adhesive layer having a phase-separated structure formed by a polyester and a polyolefin that are incompatible with each other, wherein the percentage of the region (hereinafter referred to as "region A") formed by one of the polyester and the polyolefin to the total area (100%) of the adhesive layer is 55% or more and 85% or less. This improves the image formation properties of the thermal transfer sheet of the present invention on both PET and PP transfer objects.

The percentage of the region A to the total area (100%) of the adhesive layer is preferably 60% or more and 83% or less, more preferably 64% or more and 80% or less.

Preferably, the region A is formed by the polyester from the viewpoint of the alcohol resistance.

The adhesive layer may contain two or more kinds of the polyesters and may contain two or more kinds of the polyolefins.

The percentage of the area of the region each formed by polyester or polyolefin can be determined by the following method.

First, an image of the surface of the adhesive layer (500×) is obtained using a digital microscope (Keyence Corporation, VHX-1000).

The obtained image is subjected to binarization using an image processing software (Image J, National Institutes of Health) to determine the percentages of the areas of the regions A and B. The binarization process was performed using the default threshold of Image J. The default threshold is determined by the IsoData algorithm described in Technical Document 1 (Ridler, T W & Calvard, S (1978), "Picture thresholding using an iterative selection method", IEEE Transactions on Systems, Man and Cybernetics 8: 630-632).

Figure 4:
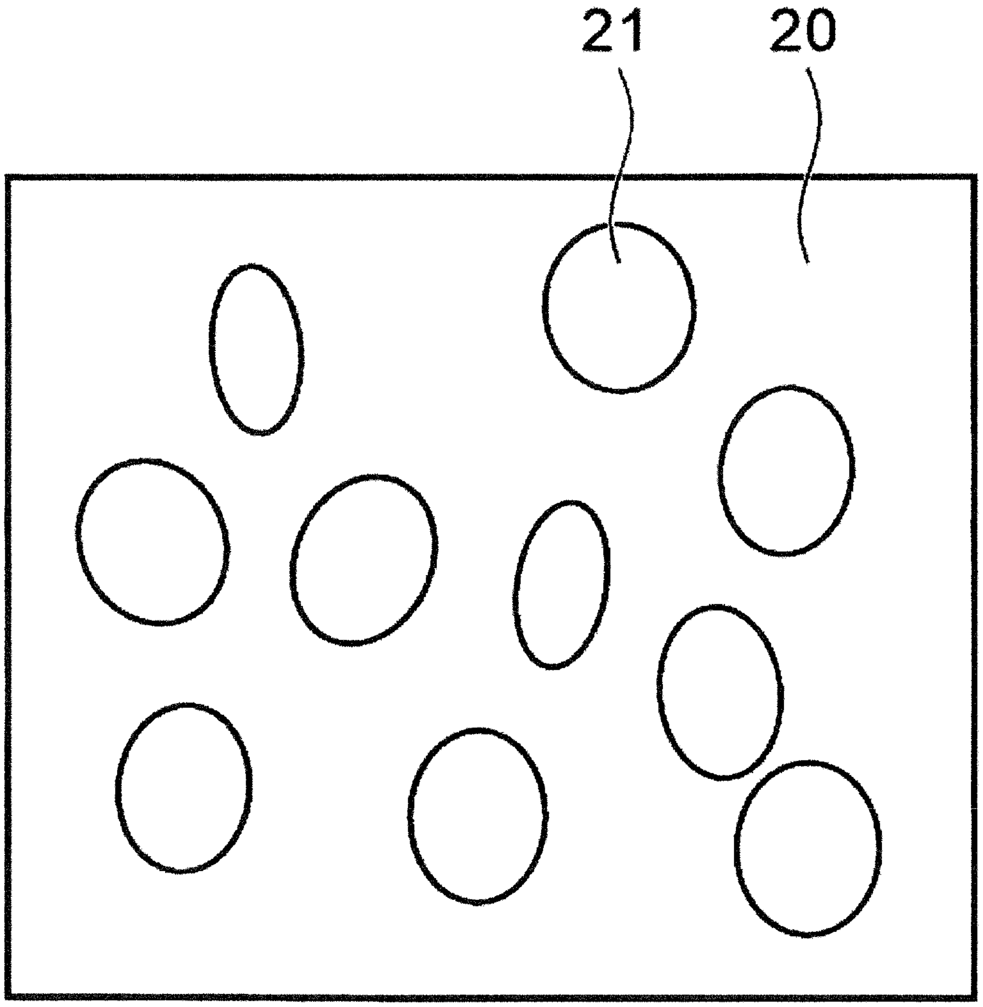
FIG. 4 is a schematic front view showing one embodiment of the phase-separated structure of the adhesive layer.

As used herein, the term "phase-separated structure" refers to, for example, a sea-island structure comprising a continuous sea structure 20 and discontinuous island structures 21 scattering in the sea structure 20, as shown in FIG. 4.

Figure 5:
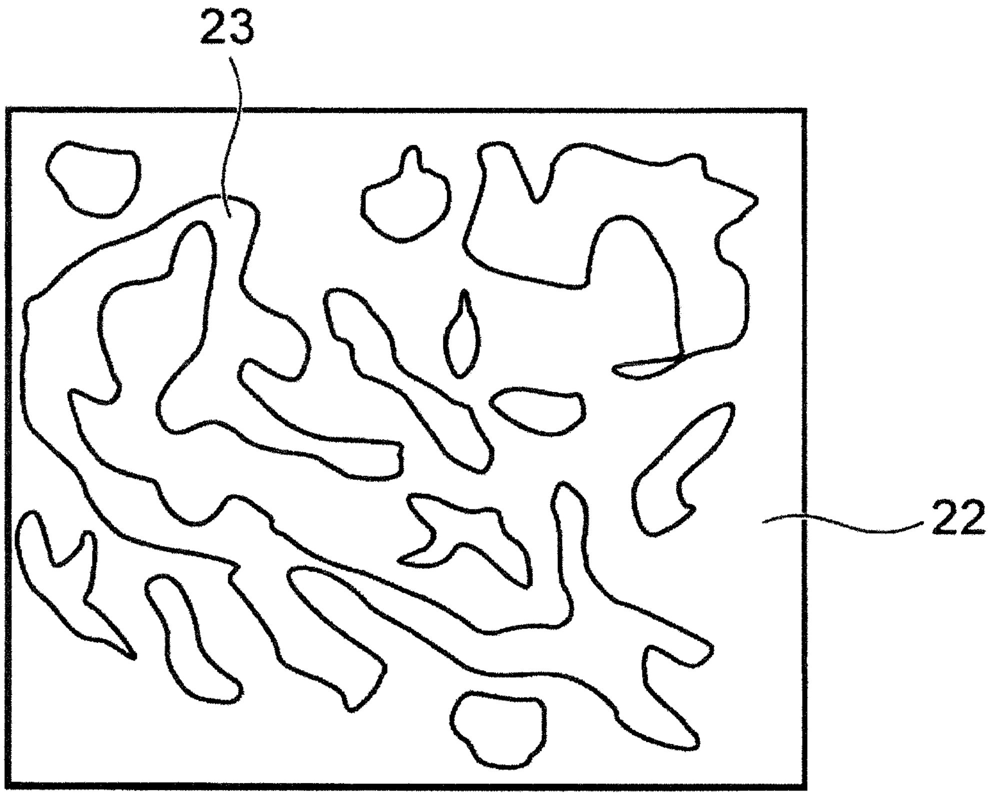
FIG. 5 is a schematic front view showing one embodiment of the phase-separated structure of the adhesive layer.

Also, examples of the structure includes a structure comprising two continuous phases 22 and 23, as shown in FIG. 5.

The Mn of the polyester contained in the adhesive layer is preferably 3,000 or more and 50,000 or less, more preferably 5,000 or more and 30,000 or less. This further improves the image formation properties of the thermal transfer sheet of the present invention on both PET and PP transfer objects.

The glass transition temperature (Tg) of the polyester contained in the adhesive layer is preferably 20° C. or more and 90° C. or less, more preferably 50° C. or more and 80° C. or less. This further improves the image formation properties of the thermal transfer sheet of the present invention on both PET and PP transfer objects.

In the present invention, the Tg is a value determined by differential scanning calorimetry (DSC) according to JIS K 7121.

The content of the polyester in the adhesive layer is preferably 61% by mass or more and 87% by mass or less, more preferably 70% by mass or more and 85% by mass or less. This further improves the alcohol resistance of the printed matter produced using the thermal transfer sheet of the present invention.

As used herein, the term "polyolefin" includes an olefin polymer; a copolymer of olefin and another compound; an acid (such as maleic acid)-modified product of the polymer (modified polyolefin); a chlorinated product of the polymer (chlorinated polyolefin); or an acid-modified and chlorinated product of the polymer (hereinafter referred to as "acid-modified chlorinated polyolefin").

Of these, preferred polyolefin is a chlorinated polyolefin or an acid-modified chlorinated polyolefin, and more preferred an acid-modified chlorinated polyolefin, from the viewpoint of the image formation properties on both PET and PP transfer objects.

Examples of the olefin include ethylene, propylene, butene, pentene, hexene, and octene.

The chlorination rate of the chlorinated polyolefin is preferably 10% or more and 55% or less, more preferably 17% or more and 30% or less. This further improves the image formation properties of the thermal transfer sheet of the present invention on both PET and PP transfer objects.

In the present invention, the chlorination rate of the polyolefin can be determined by a method of measuring chlorine in a chlorine containing resin according to JIS K 7229 (issued in 1995).

The Mn of the polyolefin is preferably less than 50,000, more preferably 1,000 or more and less than 30,000, still more preferably 5,000 or more and less than 20,000. This further improves the image formation properties of the thermal transfer sheet of the present invention on both PET and PP transfer objects. This also improves the stability over time of the adhesive layer-forming coating liquid that is used in formation of the adhesive layer.

The Tg of the polyolefin is preferably 20° C. or more and 90° C. or less, more preferably 50° C. or more and 80° C. or less. This further improves the image formation properties of the thermal transfer sheet of the present invention on both PET and PP transfer objects.

The content of the polyolefin in the adhesive layer is preferably 13% by mass or more and 40% by mass or less, more preferably 15% by mass or more and 35% by mass or less. This further improves the alcohol resistance of the printed matter produced using the thermal transfer sheet of the present invention.

Without impairing the characteristics of the present invention, the adhesive layer can contain a resin material other than polyolefin and polyester, examples of which include vinyl resins, (meth)acrylic resins, polyurethanes, cellulose resins, polyamides, polyolefins, and styrene resins.

The content of the resin material in the adhesive layer is preferably 70% by mass or more, more preferably 90% by mass or more. This further improves the image formation properties of the thermal transfer sheet of the present invention on both PET and PP transfer objects. This also improves the alcohol resistance.

In one embodiment, the adhesive layer preferably does not contain any filler, and the content of the filler is preferably 5% by mass or less, more preferably 3% by mass or less, still more preferably 1% by mass or less, from the viewpoint of the alcohol resistance.

Without impairing the characteristics of the present invention, the adhesive layer can contain the additive described above.

The thickness of the adhesive layer is preferably 0.05 μm or more and 0.5 μm or less, more preferably 0.1 μm or more and 0.3 μm or less. This further improves the alcohol resistance and the adhesion with a transfer object.

The adhesive layer can be formed by dispersing or dissolving the above-described materials in water or a suitable solvent to prepare an adhesive layer-forming coating liquid; applying the coating liquid on, for example, the colored layer by a known means, such as by roll coating, reverse roll coating, gravure coating, reverse gravure coating, bar coating, or rod coating, to form a film; and drying the film.

Preferably, the adhesive layer-forming coating liquid contains toluene and methyl ethyl ketone (MEK).

The ratio of the contents of toluene and MEK in the adhesive layer-forming coating liquid is preferably 25/75 or more and 95/5 or less, more preferably 50/50 or more and 90/10 or less in terms of mass. This further improves the image formation properties of the thermal transfer sheet of the present invention on both PET and PP transfer objects.

(Peeling Layer)

The transfer layer included in the thermal transfer sheet of the present invention can include a peeling layer, which improves the transfer properties of the transfer layer.

In one embodiment, the peeling layer contains at least one kind of a polyethylene glycol having a Mn of 8,000 or more and 23,000 or less, which, hereinafter, may be referred to as simply "polyethylene glycol". This further improves the image formation properties on both PET and PP transfer objects.

From the viewpoint of the image formation properties of the thermal transfer sheet of the present invention on both PET and PP transfer objects, the Mn of the polyethylene glycol is preferably 9,000 or more and 19,000 or less, more preferably 10,000 or more and 17,000 or less.

The melting point of the polyethylene glycol is preferably 55° C. or more and 65° C. or less, more preferably 60° C. or more and 65° C. or less. This further improves the image formation properties on both PET and PP transfer objects.

In the present invention, the melting point can be measured by differential scanning calorimetry (DSC) according to JIS K 7121.

The content of the polyethylene glycol in the peeling layer is preferably 40% by mass or more and 100% by mass or less, more preferably 45% by mass or more and 100% by mass or less. This further improves the image formation properties on both PET and PP transfer objects.

The peeling layer may contain a resin material other than the polyethylene glycol having a Mn of 8,000 or more and 23,000 or less. Examples of the resin material include polyol resins such as a polyethylene glycol having a Mn of less than 8,000, a polyethylene glycol having a Mn of more than 23,000 and a polypropylene glycol, polyolefins, vinyl resins, (meth)acrylic resins, imide resins, cellulose resins, styrene resins, and ionomer resins.

Preferably, the peeling layer contains a wax, for example, a microcrystalline wax, a carnauba wax, a paraffin wax, a Fischer-Tropsch wax, a Japan wax, a beeswax, a spermaceti wax, an insect wax, a wool wax, a shellac wax, a Candelilla wax, a petrolactam, a partially denatured wax, a fatty acid ester, or a fatty acid amide.

Such a wax contained in the peeling layer further improves the abrasion resistance of the printed matter produced using the thermal transfer sheet of the present invention. Also, such a wax can be dispersed or dissolved in water or a suitable solvent along with the above-described polyethylene glycol and the like to improve the stability over time of the prepared coating liquid.

The content of the wax in the peeling layer is preferably 20% by mass or more and 60% by mass or less, preferably 30% by mass or more and 55% by mass or less. This further improves the abrasion resistance of the printed matter, as well as the stability over time of the coating liquid described above.

Without impairing the characteristics of the present invention, the peeling layer may contain an additive such as a filler, a plasticizer, an antistatic, an ultraviolet absorber, an inorganic particle, an organic particle, a release agent, or a dispersant.

The thickness of the peeling layer is preferably 0.1 μm or more and 1 μm or less, more preferably 0.2 μm or more and 0.6 μm or less. This further improves the image formation properties on both PET and PP transfer objects, as well as improves the transfer properties of the transfer layer.

The peeling layer can be formed by dispersing or dissolving the above-described materials in water or a suitable solvent; applying the dispersion or solution on, for example, the substrate by a known means, such as by roll coating, reverse roll coating, gravure coating, reverse gravure coating, bar coating or rod coating to form a film; and drying the film.

(Back Layer)

In one embodiment, the thermal transfer sheet of the present invention includes a back layer on the surface not provided with the transfer layer, of the substrate. This allows for prevention of, for example, sticking and wrinkling due to heating during thermal transfer.

In one embodiment, the back layer contains a resin material, examples of which include cellulose resins, styrene resins, vinyl resins, polyesters, polyurethanes, silicone-modified polyurethanes, fluorine-modified polyurethanes, and (meth)acrylic resins.

In one embodiment, the back layer contains a two-part curable resin as a resin material, which is cured when combined with, for example, an isocyanate compound. Examples of such a resin include polyvinyl acetals such as polyvinyl acetoacetal and polyvinyl butyral.

In one embodiment, the back layer contains an inorganic particle or an organic particle. This allows for further prevention of, for example, sticking and wrinkling due to heating during thermal transfer.

Examples of the inorganic particle include clay minerals such as talc and kaolin, carbonates such as calcium carbonate and magnesium carbonate, hydroxides such as aluminum hydroxide and magnesium hydroxide, sulfates such as calcium sulfate, oxides such as silica, graphite, niter, and boron nitride.

Examples of the organic particle include organic resin particles including (meth)acrylic resins, TEFLON® resins, silicone resins, lauroyl resins, phenol resins, acetal resins, styrene resins, and polyamides or the like; and cross-linked resin particles obtained by reacting them with a cross-linking agent.

The thickness of the back layer is preferably 0.1 μm or more and 2 μm or less, more preferably 0.1 μm or more and 1 μm or less. This allows for maintenance of the heat energy transfer during thermal transfer, as well as prevention of, for example, sticking and wrinkling.

The back layer can be formed by dispersing or dissolving the above-described materials in water or a suitable solvent; applying the dispersion or solution on the substrate by a known means, such as by roll coating, reverse roll coating, gravure coating, reverse gravure coating, bar coating or rod coating to form a film; and drying the film.

(Release Layer)

In one embodiment, the thermal transfer sheet of the present invention includes a release layer between the substrate and the transfer layer. This improves the transfer properties of the thermal transfer sheet.

In one embodiment, the release layer contains a resin material, examples of which include (meth)acrylic resins, polyurethanes, polyamides, polyesters, melamine resins, polyol resins, cellulose resins, and silicone resins.

In one embodiment, the release layer also contains a release agent, such as a silicone oil, a phosphate ester-based plasticizer, a fluorine-based compound, a wax, a metal soap, or a filler.

The thickness of the release layer can be, but is not limited to, for example, 0.2 μm or more and 2 μm or less.

The release layer can be formed by dispersing or dissolving the above-described materials in water or a suitable solvent; applying the dispersion or solution on, for example, the substrate by a known means, such as by roll coating, reverse roll coating, gravure coating, reverse gravure coating, bar coating or rod coating to form a film; and drying the film.

(Primer Layer)

In one embodiment, the thermal transfer sheet of the present invention includes a primer layer on one or both surfaces of the substrate. This improves the adhesion of the substrate with an adjacent layer.

In one embodiment, the primer layer contains, for example, a polyester, a vinyl resin, a polyurethane, a (meth) acrylic resin, a polyamide, a polyether, or a cellulose resin.

The thickness of the primer layer can be, but is not limited to, for example, 0.2 μm or more and 2 μm or less.

The primer layer can be formed by dispersing or dissolving the above-described materials in water or a suitable solvent; applying the dispersion or solution on the substrate by a known means, such as by roll coating, reverse roll coating, gravure coating, reverse gravure coating, bar coating or rod coating to form a film; and drying the film.

EXAMPLES

The present invention will now be described with reference to Examples, but is not limited thereto.

Example 1

A peeling layer-forming coating liquid having the composition described below was applied to one surface of an easy-adhesion treated PET film having a thickness of 4.5 μm and dried to form a peeling layer having a thickness of 0.3 μm.

<Peeling Layer-Forming Coating Liquid>

- Polyethylene glycol (PEG): 10 parts by mass (Sanyo Chemical Industries Ltd., PEG10000, Mn: 10,000, melting point: 62° C.)
- Methyl ethyl ketone (MEK): 50 parts by mass
- Isopropanol (IPA): 50 parts by mass A colored layer-forming coating liquid having the composition described below was applied to the peeling layer formed as described above and dried to form a colored layer having a thickness of 0.5 μm.

<Colored Layer-Forming Coating Liquid>

- Vinyl chloride-vinyl acetate copolymer: 32 parts by mass (Nissin Chemical Co., Ltd., SOBIN® CNL, Mn: 12,000)
- Carbon black: 16 parts by mass
- Toluene: 100 parts by mass
- MEK: 100 parts by mass An adhesive layer-forming coating liquid having the composition described below was applied to the colored layer formed as described above and dried to form an adhesive layer having a thickness of 0.2 μm.

<Adhesive Layer-forming Coating Liquid>

- Polyester: 8 parts by mass (Toyobo Co., Ltd., VYLON® GK250, Mn: 10,000, Tg: 60° C.)
- Maleic Acid-modified Chlorinated Polypropylene: 2 parts by mass (Nippon Paper Industries Co., Ltd., SUPERCHLON® 3221S, Mn: 50,000, softening point: 70° C.)
- Toluene: 80 parts by mass
- MEK: 20 parts by mass A back layer-forming coating liquid having the composition described below was applied to the other surface of the PET film and dried to form a back layer having a thickness of 0.3 μm, thereby providing a thermal transfer sheet.

<Back Layer-forming Coating Liquid>

- Styrene-acrylonitrile copolymer: 11 parts by mass
- Linear saturated polyester: 0.3 parts by mass
- Zinc stearylphosphate: 6 parts by mass
- Melamine resin powder: 3 parts by mass
- MEK: 80 parts by mass

Examples 2 to 4 and Comparative Examples 1 and 2

Thermal transfer sheets were produced in the same manner as in Example 1 except that the contents of the polyester and the maleic acid-modified chlorinated polypropylene in the adhesive layer were changed to the values as shown in Table 1.

Example 5

A thermal transfer sheet was produced in the same manner as in Example 1 except that the maleic acid-modified chlorinated polypropylene contained in the adhesive layer was changed to a chlorinated polypropylene (Toyobo Co., Ltd., HARDLEN® 16-LP, chlorination rate: 32%).

Example 6

A thermal transfer sheet was produced in the same manner as in Example 1 except that the maleic acid chlorinated polypropylene contained in the adhesive layer was changed to a maleic acid-modified polypropylene (Sanyo Chemical Industries Ltd., UMEX® 1010, Mn: 30,000).

Comparative Example 3

A thermal transfer sheet was produced in the same manner as in Example 1 except that the solvents contained in the adhesive layer-forming coating liquid were changed to toluene alone.

Comparative Example 4

A thermal transfer sheet was produced in the same manner as in Example 2 except that the solvents contained in the adhesive layer-forming coating liquid were changed to toluene alone.

Comparative Example 5

A thermal transfer sheet was produced in the same manner as in Example 1 except that the composition of the adhesive layer-forming coating liquid was changed as described below.

<Adhesive Layer-Forming Coating Liquid>

- Polyester: 8.5 parts by mass
- Maleic acid-modified chlorinated polypropylene: 1 part by mass
- Filler: 0.5 parts by mass (Nippon Shokubai Co., Ltd., EPOSTAR® S6, mean particle diameter: 0.4 μm)
- Toluene: 80 parts by mass
- MEK: 20 parts by mass A 500× image of the adhesive layer included in the thermal transfer sheet obtained in Examples and Comparative Examples described above was obtained using a digital microscope (Keyence Corporation, VHX-1000).

The obtained image was then subjected to binarization using an image processing software (National Institutes of Health, Image J) to determine the percentage of the areas of a bright region A and a dark region B to the total area (100%) of the adhesive layer. The results are summarized in Table 1.

The adhesive layer included in the thermal transfer sheet in Examples 2, 4, and 5 had a sea-island structure as shown in FIG. 4.

The adhesive layer included in the thermal transfer sheet in Examples 1, 3, and 6 had a structure comprising two continuous phases as shown in FIG. 5.

<<Evaluation of Image Formation Properties>>

Figure 6:
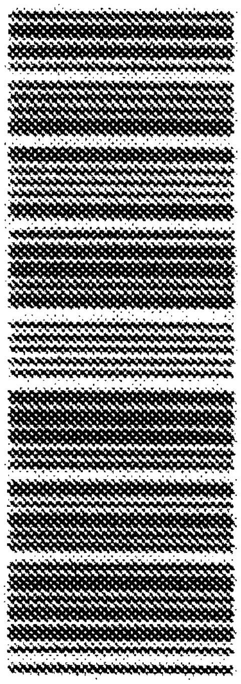
FIG. 6 shows an image of the Ladder barcode formed in Examples.

A ladder barcode image (barcode perpendicular to the print direction) as shown in FIG. 6 was formed on a polyethylene terephthalate (PET) label (Avery Dennison Corporation, 72825) using the thermal transfer sheet obtained in Examples and Comparative Examples, and a label printer (Zebra Technologies Corporation, Zebra140Xi4, thermal head: 200 dpi). The print speed was 6 IPS (inch per second), and the print energy was 18.

A ladder barcode image was also formed on a polypropylene (PP) label (UPM Raflatac, Inc. Polyprint PLUS Matt-coated synthetic PP film) in the same manner.

The formed image was verified using a barcode verifier (Honeywell International, Inc., Quick Check 850), and evaluated based on the criteria described below. Table 1 summarizes the evaluation results.

(Evaluation Criteria)

A: verified as A by the barcode verifier.

B: verified as B by the barcode verifier.

NG: verified as C or lower by the barcode verifier.

<<Evaluation of Alcohol Resistance>>

Figure 7:
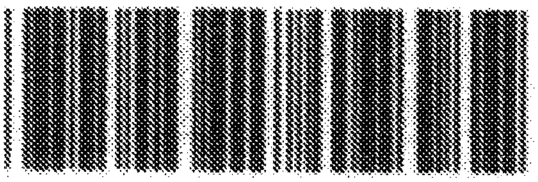
FIG. 7 shows an image of the Picket barcode formed in Examples.

A picket barcode image (barcode parallel to the print direction) as shown in FIG. 7 was formed on the PET label described above using the thermal transfer sheet obtained in Examples and Comparative Examples and the label printer described above. The print speed was 6 IPS, and the print energy was 22. The formed image was verified using the barcode verifier.

Then, the surface of the image formed as described above was rubbed 20 times back and forth with a cotton cloth soaked in 0.5 mL of isopropanol under a load of 200 g on a color fastness to rubbing tester (FR-2S, Suga Test Instruments Co., Ltd., in accordance with MS L 0849 (2013) rubbing tester type II), under an environment of 22.5° C. and 40% relative humidity. The rubbed image was verified using the barcode verifier.

The changes in the verification results obtained by the barcode verifier before and after abrasion were evaluated based on the evaluation criteria described below. Table 1 summarizes the evaluation results.

(Evaluation Results)

A: no change between the verification results obtained by the barcode verifier.

B: One-grade decline in the verification result obtained by the barcode verifier.

NG: Two or more-grade decline in the verification result obtained by the barcode verifier.

REFERENCE SIGNS LIST

10: thermal transfer sheet
11: substrate
12: colored layer
13: adhesive layer
14: transfer layer
15: peeling layer
16: back layer
20: sea structure
21: island structure
22 and 23: two continuous phases

The invention claimed is:

1. A thermal transfer sheet, comprising:

a substrate; and a transfer layer comprising a colored layer and an adhesive layer, wherein the adhesive layer has a phase-separated structure formed by a polyester and a polyolefin that are incompatible with each other, wherein a percentage of a region formed by one of the polyester and the polyolefin to a total area (100%) of the adhesive layer is 55% or more and 85% or less, wherein the polyolefin is a chlorinated polyolefin, wherein the transfer layer further comprises a peeling layer located under the colored layer, wherein the peeling layer contains polyethylene glycol having a number average molecular weight in a range of 8,000 to 23,000, and wherein a content of the polyester in the adhesive layer is in a range of 61% by mass to 87% by mass.

2. The thermal transfer sheet according to claim 1, wherein the percentage of the region formed by the polyester to the total area (100%) of the adhesive layer is in a range of 55% to 85%.

TABLE 1

| | Composition of adhesive layer | | | | | | Percent area | | Evaluation of image formation properties | | |
|---|---|---|---|---|---|---|---|---|---|---|---|
| | Polyester content (% by mass) | Acid-modified chlorinated polyolefin content (% by mass) | Chlorinated polyolefin content (% by mass) | Acid-modified polyolefin content (% by mass) | Filler content (% by mass) | Solvent used in adhesive layer-forming coating liquid (mass ratio) | Percent area of region A (%) | Percent area of region B (%) | PET label | PP label | Evaluation of alcohol resistance |
| Ex. 1 | 80 | 20 | | | | toluene + MEK (80/20) | 77 | 23 | A | A | A |
| Ex. 2 | 70 | 30 | | | | toluene + MEK (80/20) | 65 | 35 | A | A | A |
| Ex. 3 | 85 | 15 | | | | toluene + MEK (80/20) | 83 | 17 | A | B | A |
| Ex. 4 | 65 | 35 | | | | toluene + MEK (80/20) | 80 | 20 | A | A | B |
| Ex. 5 | 70 | | 30 | | | toluene + MEK (80/20) | 62 | 38 | A | B | B |
| Ex. 6 | 80 | | | 20 | | toluene + MEK (80/20) | 84 | 16 | A | B | A |
| Com. Ex. 1 | 90 | 10 | | | | toluene + MEK (80/20) | 99 | 1 | A | NG | A |
| Com. Ex. 2 | 60 | 40 | | | | toluene + MEK (80/20) | 95 | 5 | A | A | NG |
| Com. Ex. 3 | 80 | 20 | | | | toluene | 94 | 6 | A | NG | A |
| Com. Ex. 4 | 70 | 30 | | | | toluene | 86 | 14 | A | NG | A |
| Com. Ex. 5 | 85 | 10 | | | 5 | toluene + MEK (80/20) | 90 | 10 | B | B | NG |

3. The thermal transfer sheet according to claim 1, wherein the chlorinated polyolefin is an acid-modified chlorinated polyolefin.

4. The thermal transfer sheet according to claim 1, wherein the chlorinated polyolefin has a chlorination rate in a range of 10% to 55%.

5. The thermal transfer sheet according to claim 1, wherein the adhesive layer has a content of the polyolefin in a range of 13% by mass to 40% by mass.

6. The thermal transfer sheet according to claim 1, wherein the adhesive layer is formed with an adhesive layer-forming coating liquid containing toluene and methyl ethyl ketone.

7. The thermal transfer sheet according to claim 1, wherein the polyolefin has a number average molecular weight of less than 50,000.

8. The thermal transfer sheet according to claim 1, wherein the adhesive layer has a thickness in a range of 0.05 μm to 0.5 μm.

9. The thermal transfer sheet according to claim 1, wherein the peeling layer further contains a wax.

10. The thermal transfer sheet according to claim 1, wherein the polyester has a number average molecular weight in a range of 3,000 to 50,000.

* * * * *